US008965269B2

(12) United States Patent
McClaughry et al.

(10) Patent No.: US 8,965,269 B2

(45) Date of Patent: Feb. 24, 2015

(54) CONFERENCE ROOM MODE OF A MEDIA DEVICE

(71) Applicant: Apple Inc., Cupertino, CA (US)

(72) Inventors: Patrick E. McClaughry, Sunnyvale, CA (US); Elbert D. Chen, Cupertino, CA (US); James A. Young, Livermore, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 13/912,068

(22) Filed: Jun. 6, 2013

(65) Prior Publication Data

US 2014/0362167 A1 Dec. 11, 2014

(51) Int. Cl.
*H04H 20/71* (2008.01)
*H04N 7/15* (2006.01)

(52) U.S. Cl.
CPC .................................... *H04N 7/15* (2013.01)
USPC ................................................ 455/3.01

(58) Field of Classification Search
USPC .......................... 455/3.01; 705/14.4; 709/219
See application file for complete search history.

(56) References Cited

U.S. PATENT DOCUMENTS 8,397,261 B2 3/2013 Xu et al.
2003/0140119 A1* 7/2003 Acharya et al. ............... 709/219
2005/0030255 A1 2/2005 Chiu et al.
2009/0089825 A1 4/2009 Coldwell
2009/0231270 A1 9/2009 Vartiainen et al.
2009/0291631 A1* 11/2009 Xue et al. ..................... 455/3.01
2012/0030632 A1 2/2012 McRae et al.
2012/0254991 A1 10/2012 Levien et al.
2012/0331200 A1 12/2012 Smith et al.
2013/0317892 A1* 11/2013 Heerboth ..................... 705/14.4
2014/0146727 A1* 5/2014 Segev et al. .................. 370/311

OTHER PUBLICATIONS

International Search Report and Written Opinion of the International Searching Authority, PCT Application Serial No. PCT/US2014/040263, Oct. 13, 2014, 9 pp.

* cited by examiner

*Primary Examiner* — Mohammad Islam
(74) *Attorney, Agent, or Firm* — Fish & Richardson P.C.

(57) ABSTRACT

Techniques for automatically configuring and controlling a conference room mode setting of a digital media device are described. A digital media device can be programmed to enter a conference room operating mode upon a trigger event. The trigger event can include a time-based trigger or an event-based trigger. In the conference room mode, the digital media device can provide for display an identifier of the digital media device and an identifier of a network for accessing the digital media device. The identifier of the digital media device and identifier of a network can be used by a mobile device to connect to the digital media device and to submit content to the digital media device. Once configured, the digital media device can enter the conference room mode automatically, without requiring a user to select the conference room mode using a remote control.

27 Claims, 7 Drawing Sheets

120
106
Network Name: MyWiFi
Device Name: TV 1
Access Code: 123abc
104
110
114
116
102
112
Send Content to:
Network:
MyWiFi
Other
122
Device:
TV 1
Other
124

CONFERENCE ROOM MODE OF A MEDIA DEVICE

TECHNICAL FIELD

This disclosure relates generally to media device management.

BACKGROUND

Many electronic devices can function as media devices (e.g., digital media receivers or DMRs) suitable for receiving digital media content from a communications network and providing the digital media content for presentation to a user. For example, a home entertainment system often includes a DMR configured to download digital multimedia content including pictures, music, or video from remote media services and to provide the digital multimedia content for play on a display screen. Some DMRs can function as an intermediary between a mobile device (e.g., a smart phone) and the display screen (e.g., a monitor or television). The DMR can receive the digital multimedia content from the mobile device after establishing a wired or wireless communication channel with the mobile device. To establish the communication channel, a user can enter, on the mobile device, a name of a network to access a particular DMR, and an identifier of the DMR. The mobile device can then establish the communication channel based on the name of the network and the identifier. Sometimes, many networks and devices can be detected by the mobile device. It may not be immediately apparent which network or identifier is the one for a display device in view of a user.

SUMMARY

Techniques for automatically configuring and controlling a conference room mode setting of a digital media device are described. A digital media device can be programmed to enter a conference room operating mode upon a trigger event. The trigger event can be a time-based trigger or an event-based trigger. In the conference room mode, the digital media device can provide for display an identifier of the digital media device and an identifier of a network for accessing the digital media device. The identifier of the digital media device and identifier of a network can be used by a mobile device to connect to the digital media device and to submit content to the digital media device. Once configured, the digital media device can enter the conference room mode automatically, without requiring a user to select the conference room mode using a remote control.

The features described in this specification can be implemented to achieve the following advantages. Automatic entry into conference room mode can make selecting a device for presentation in a meeting easier and more intuitive. When a user makes a presentation in a meeting in a conference room, the user may wish to send content from the user's mobile device to a display device located in the conference room through a digital media device. For example, the user may wish to send a slide show, a screen shot, a product demonstration, a photo, or a movie from a laptop computer, a tablet computer, or a smart phone to a television monitor. The user can send the content to the television monitor through a DMR accessible through a wireless local area network (WLAN). Many digital media devices may be connected to the WLAN. There may be many networks detectable by the mobile device. To identify the particular DMR in the room and the particular network for the DMR, conventionally, the user may have to use a remote control of the DMR to navigate to a device information screen. Automatic entry into conference room mode can eliminate the need of the remote control, and accordingly, can make the process of identifying a network and a DMR easier.

The details of one or more implementations of automatic conference room mode settings of a digital media device are set forth in the accompanying drawings and the description below. Other features, aspects, and advantages of automatic conference room mode settings of a digital media device will become apparent from the description, the drawings, and the claims.

BRIEF DESCRIPTION OF THE DRAWINGS

Like reference symbols in the various drawings indicate like elements.

DETAILED DESCRIPTION

Exemplary Conference Room Mode

Figure 1:
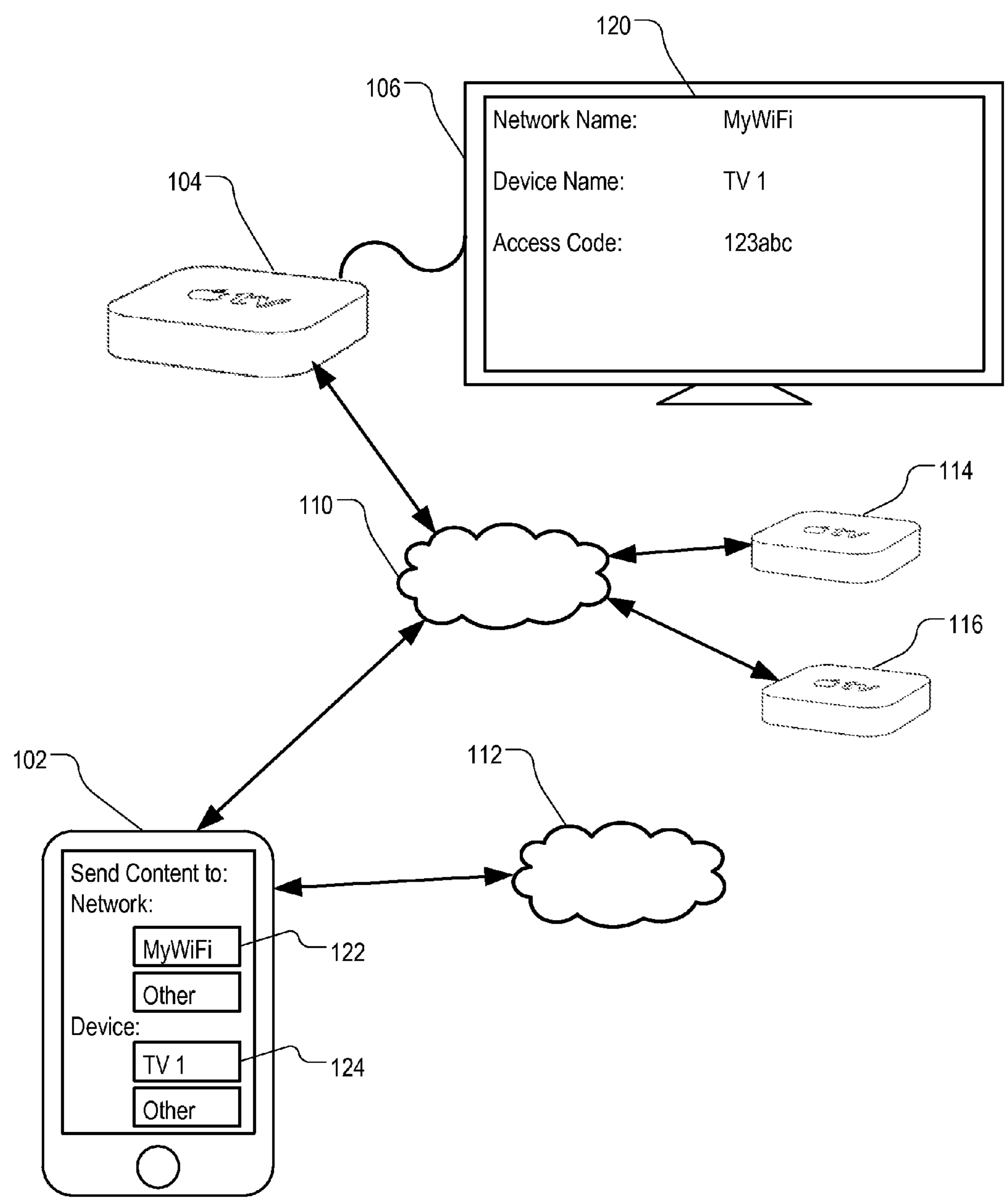
FIG. 1 is a diagram illustrating exemplary interactions between a mobile device and a digital media device in conference room mode.

FIG. 1 is a diagram illustrating exemplary interactions between a mobile device and a digital media device in conference room mode. The interactions will be described in reference to mobile device 102 and digital media device 104.

Digital media device 104 can be an electronic device programmed to download or play multimedia content including pictures, audio, or video. In addition, digital media device 104 can be programmed to receive multimedia content from mobile device 102. Digital media device 104 can be a DMR, a digital audio or video player, a mobile or stationary computing device, a digital camera, an Internet-enabled television, or a game console. Digital media device 104 can include or be coupled to display device 106. Display device 106 can be a television monitor. Digital media device 104 can be connected to network 110. Network 110 can be a local area network (e.g., a WLAN). Digital media device 104 can be located in a conference room.

Mobile device 102 can be a computing device, e.g., a laptop computer, a tablet computer, or a smart phone. A user of mobile device 102 wishes to send multimedia content wirelessly from mobile device 102 to digital media device 104. Mobile device 102 can detect multiple networks, including network 110 and network 112. In addition, on each network, mobile device 102 can detect multiple digital media devices connected to the network. For example, on network 110, mobile device 102 can detect digital media devices 104, 114, and 116.

Digital media device 104 can be configured to enter conference room mode upon one or more trigger events. In conference room mode, digital media device 104 can provide conference configuration information 120 for display on display device 106. Conference configuration information 120 can include an identifier (e.g., a network name) of network 110. Conference configuration information 120 can include an identifier (e.g., a network name) of digital media device 104. In some implementations, conference configuration information 120 can include an access code for creating a communication channel between a device and digital media device 104.

The trigger event that causes digital media device 104 to provide conference configuration information 120 for display can be configurable. The trigger event can be a temporal event, e.g., when X minutes have passed since digital media device 104 has been inactive. The trigger event can be a proximity event, e.g., when digital media device 104 detects a presence of mobile device 102 using a discovery service. The trigger event does not require navigation through functions of digital media device 104 using a remote control.

Mobile device 102 can provided the conference configuration information 120 for display. For example, mobile device 102 can provide a network identifier in conference configuration information 120 for display as option 122 for selecting a network. In addition, mobile device 102 can provide a device identifier in conference configuration information 120 for display as option 124 for selecting a media device on the network. Upon receiving a selection of network 110 and digital media device 104 as a wireless content destination, mobile device 102 can send multimedia content for display on display device 106 through network 110 and digital media device 104.

Exemplary User Interfaces

Figure 2:
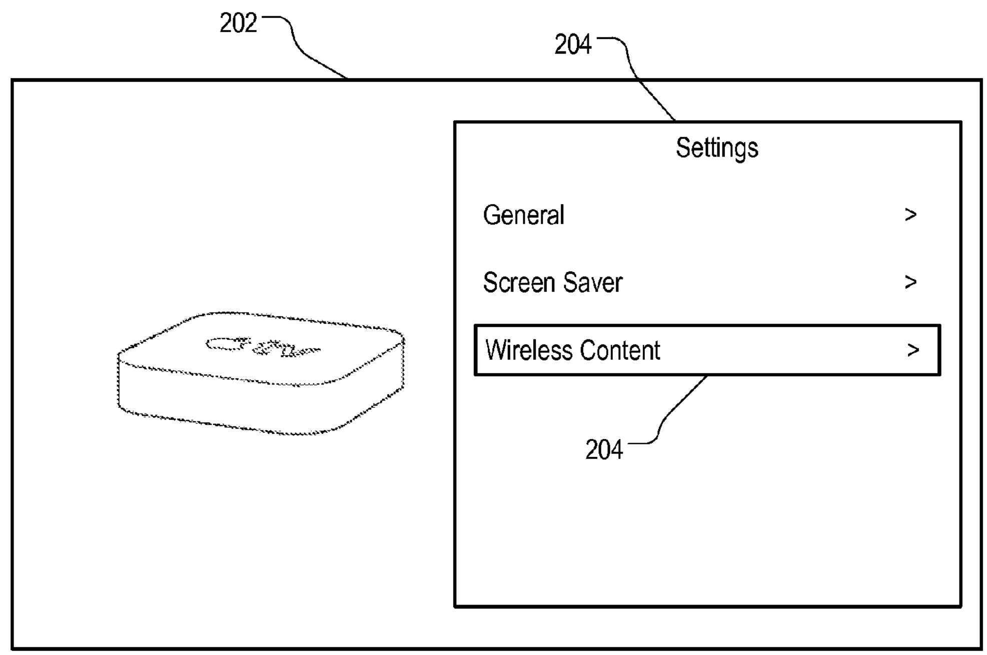
FIGS. 2-7 are exemplary user interfaces of configuring conference room mode of a digital media device.

FIGS. 2-7 are exemplary user interfaces of configuring conference room mode of digital media device 104. FIG. 2 illustrates user interface 202 for configuring functions of digital media device 104. User interface 202 can include device settings menu 204. Device settings menu 204 can include multiple options accessible by a remote control of digital media device 104 to control various operations of digital media device 104. Device settings menu 204 can include option 206 for configuring wireless content functions of digital media device 104 that relate to receiving multimedia content wirelessly from mobile devices located within communication range of digital media device 104.

Figure 3:
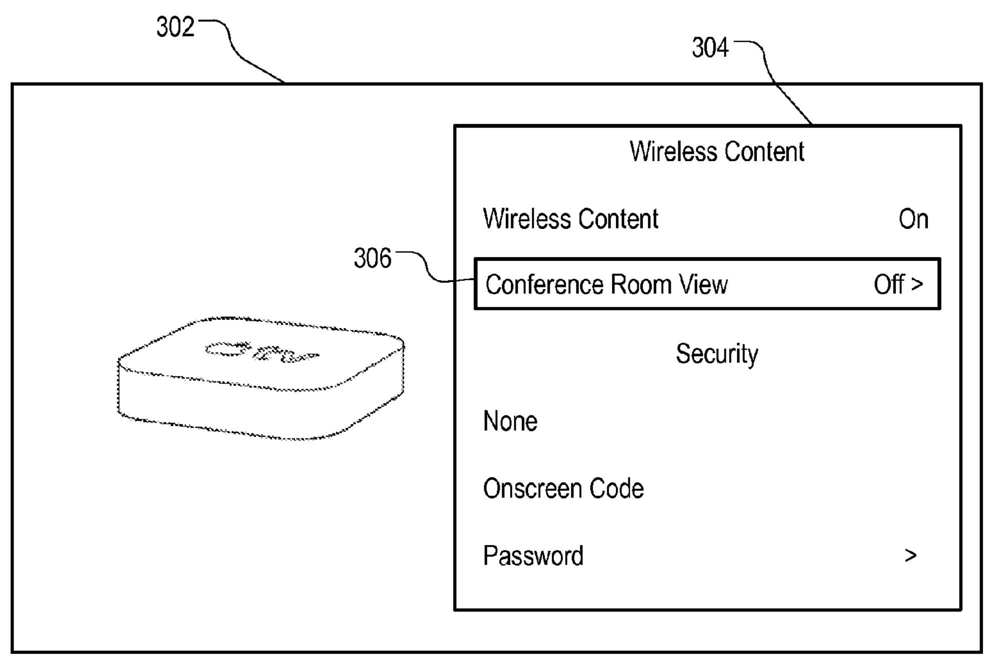

FIG. 3 illustrates user interface 302 for configuring wireless content functions of digital media device 104. Digital media device 104 can provide user interface 302 for display on display device 106 when digital media device 104 receives a user selection of option 206 (of FIG. 2). User interface 302 can include wireless content settings menu 304. Wireless content settings menu 304 can include option 306 for configuring conference room mode settings of digital media device 104.

Figure 4:
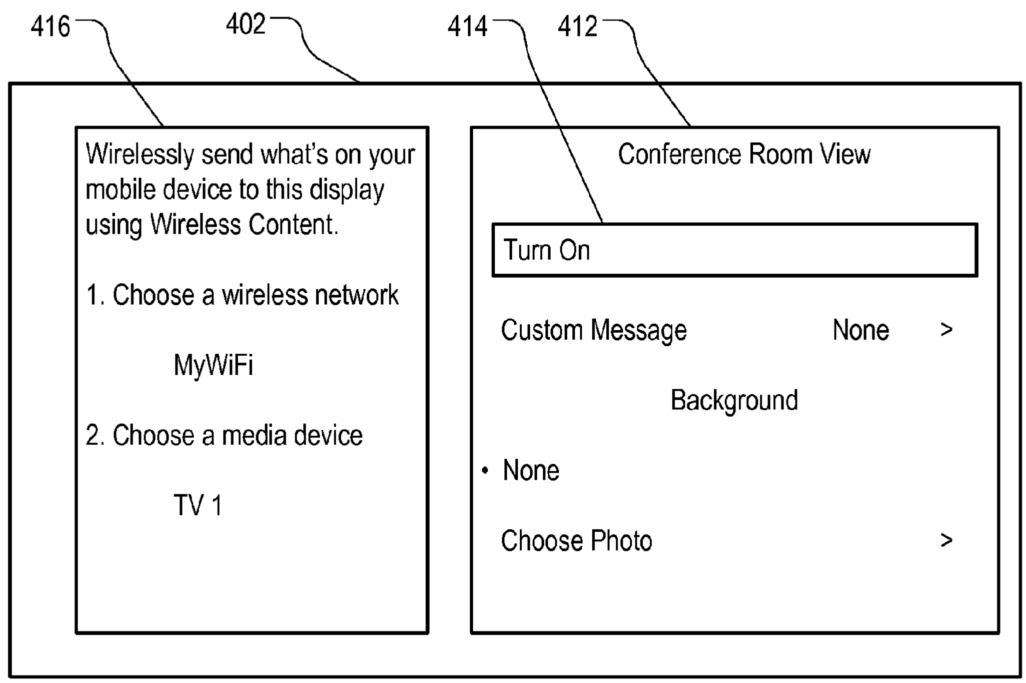

FIG. 4 illustrates user interface 402 for configuring conference room mode settings of digital media device 104. Digital media device 104 can provide user interface 402 for display on display device 106 when digital media device 104 receives a user selection of option 306 (of FIG. 3). User interface 402 can include conference room mode settings menu 412. Conference room mode settings menu 412 can include option 414 for turning on or turning off conference room mode. A selection of turning on the conference room mood need not cause digital media device 104 to enter conference room mode immediately. When digital media device 104 receives selection of option 414 from conference room mode settings menu 412, digital media device 104 can determine trigger events the occurrence of which can activate the conference room mood. In some implementations, the trigger events are user-configurable.

Conference room mode settings menu 412 can include an option for entering a custom message (e.g., "Contact Joe for password"). Digital media device 104 can provide the custom message for display as part of configuration information conference 120 (of FIG. 1) on display device 106. User interface 402 can include conference room mode preview 416. Conference room mode preview 416 can include a reduced-sized display of conference configuration information 120. The network identifier and device identifier in conference configuration information 120 can be entered by a user or automatically by digital media device 104 prior to configuration of the conference room mode settings.

Figure 5:
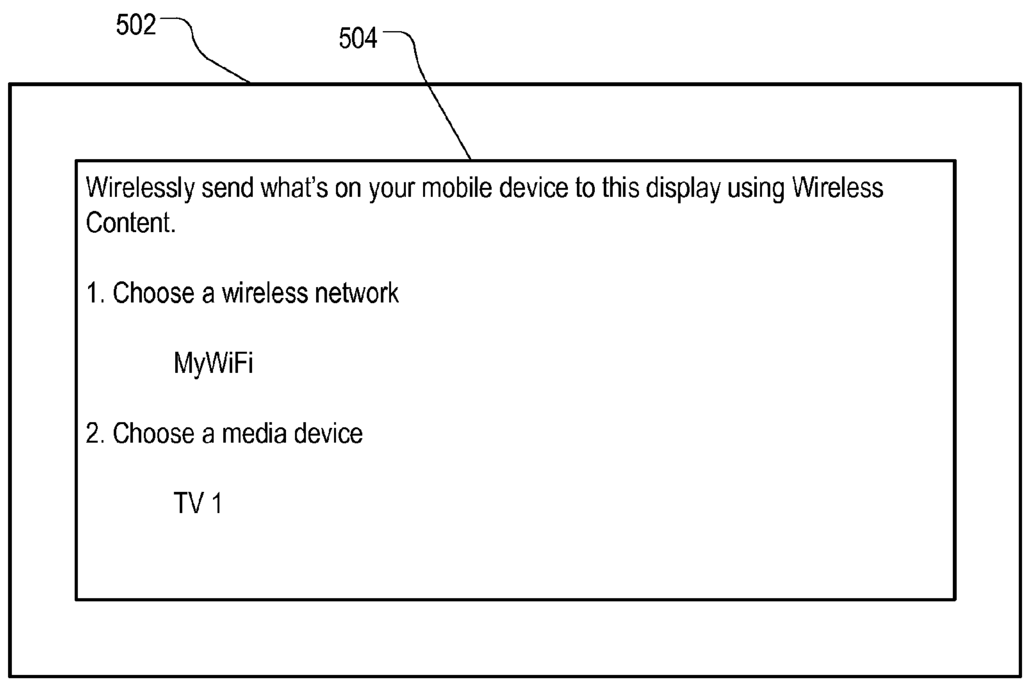

FIG. 5 illustrates exemplary user interface 502 of a conference room mode of digital media device 104. User interface 502 can include information display area 504 displaying conference configuration information 120. Digital media device 104 can provide user interface 502 for display after receiving a user selection of option 414 for turning on the conference room mode, and after the trigger event has occurred. For example, digital media device 104 can provide user interface 502 for display after a number of minutes have passed since a last activity of digital media device 104 or after digital media device 104 detects a mobile device using a discovery service. User interface 502, when activated, can hide user interface items for other functions or content of digital media device 104. For example, when activated, user interface 502 can hide tiles or icons for accessing media content from a wide area network (e.g., the Internet). User interface 502 can replace an original default screen or home screen of digital media device 104.

User interface 502 can operate in casual mode or password-restricted mode. In casual mode, if digital media device 104 receives a user input, e.g., when a user pushes a button on a remote, digital media device 104 can hide information display area 504 and display the tiles or icons for accessing other media content. The user can then access the other media content. In password-restricted mode, if digital media device 104 receives a user input, e.g., when a user pushes a button on a remote, digital media device 104 can prompt for a password. Digital media device 104 can hide information display area 504 and display the tiles or icons for accessing other media content after receiving the password.

Figure 6:
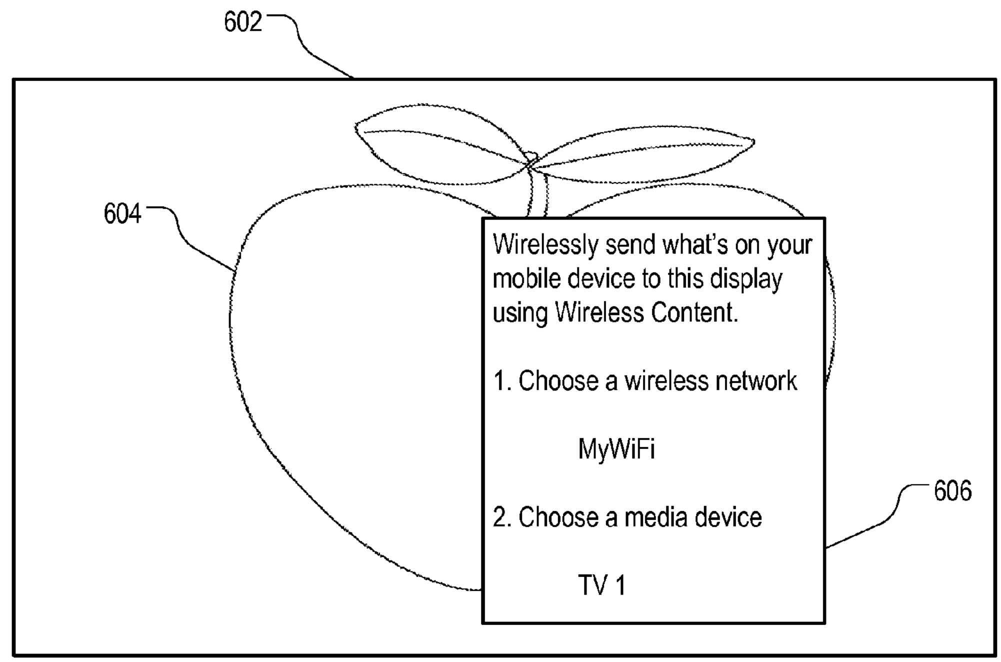

FIG. 6 illustrates exemplary user interface 602 of a conference room mode of digital media device 104 when a screen saver is activated. The screen saver of digital media device 104 can have various settings, including, for example, image 604 that can be displayed after a user-configurable time (e.g., X minutes) of inactivity. User interface 602 can include information display area 606 that is overlaid on image 604 of the screen saver. Information display area 606 can be activated when the screen server is activated. In some implementations, the screen saver can include multiple user-selected images displayed simultaneously on display device 106 (e.g., side by side, or floating). Information display area 606 can be displayed together with the user-selected images as an additional image. Information display area 606 can be animated. For example, information display area 606 can move on screen, including bouncing around, dissolving, shattering, crumbling, and reappearing.

Figure 7:
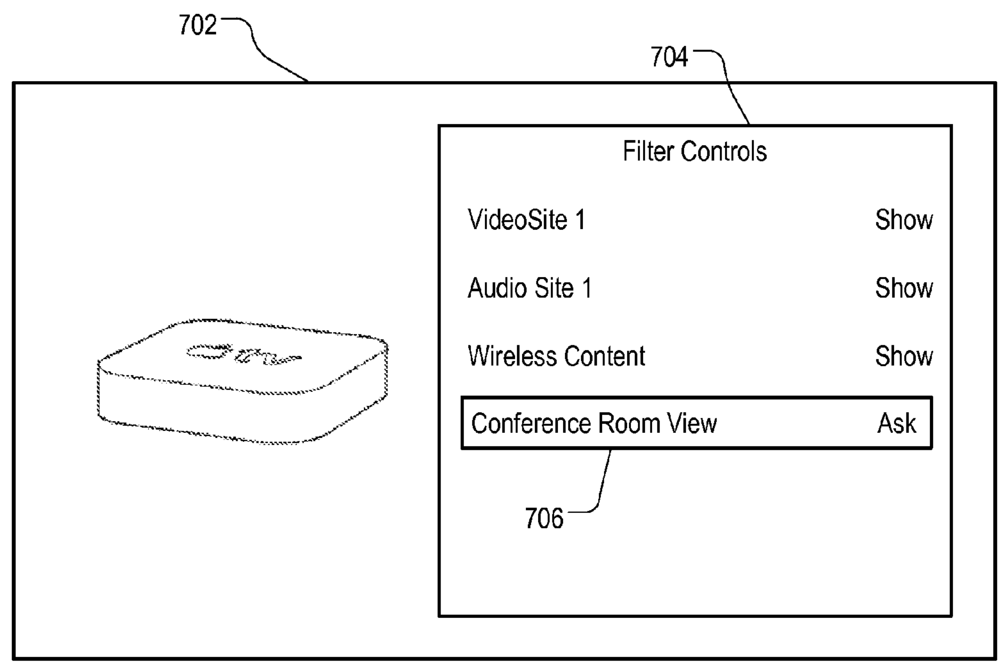

FIG. 7 illustrates exemplary user interface 702 for configuring filter settings of digital media device 104. Digital media device 104 can provide user interface 702 for display on display device 106 when digital media device 104 receives a user request to configure content filters of digital media device 104. The content filters can include parental control filters for allowing or preventing selected content from being displayed on display device 106.

User interface 702 can include filter settings menu 704 for selecting various content for blocking. Filter settings menu 704 can include option 706 for configuring a conference room mode. Option 706 can toggle between operating modes that include allowing digital media device 104 to leave a conference room mode freely, allowing digital media device 104 to leave a conference room mode but only after receiving a correct password, or prohibiting digital media device 104 from leave a conference room mode. If digital media device 104 is not allowed to leave the conference room mode, other functions of digital media device 104 are disabled such that digital media device 104 displays only the configuration information and, upon receiving multimedia content, displays only the received media content.

If digital media device 104 is not allowed to leave a conference room mode or is allowed to leave the conference room mode only after receiving a password, digital media device 104 can implement safeguard features to prevent digital media device 104 from resetting the filter values after a reboot (e.g., after digital media device 104 is unplugged from power). Upon reboot, digital media device 104 can provide a time window of X seconds during which digital media device 104 waits for an input of password. If digital media device 104 receives the correct password, digital media device 104 can unlock and allow a user to reconfigure conference room mode settings of digital media device 104. Otherwise, digital media device 104 can enter conference room mode automatically. If a full reset input is received within the time window, digital media device 104 can perform full reset operations. Full reset operations of digital media device 104 can cause digital media device 104 to erase all settings, including the conference room mode settings and all user accounts and credentials to access online content.

Exemplary Device Components

Figure 8:
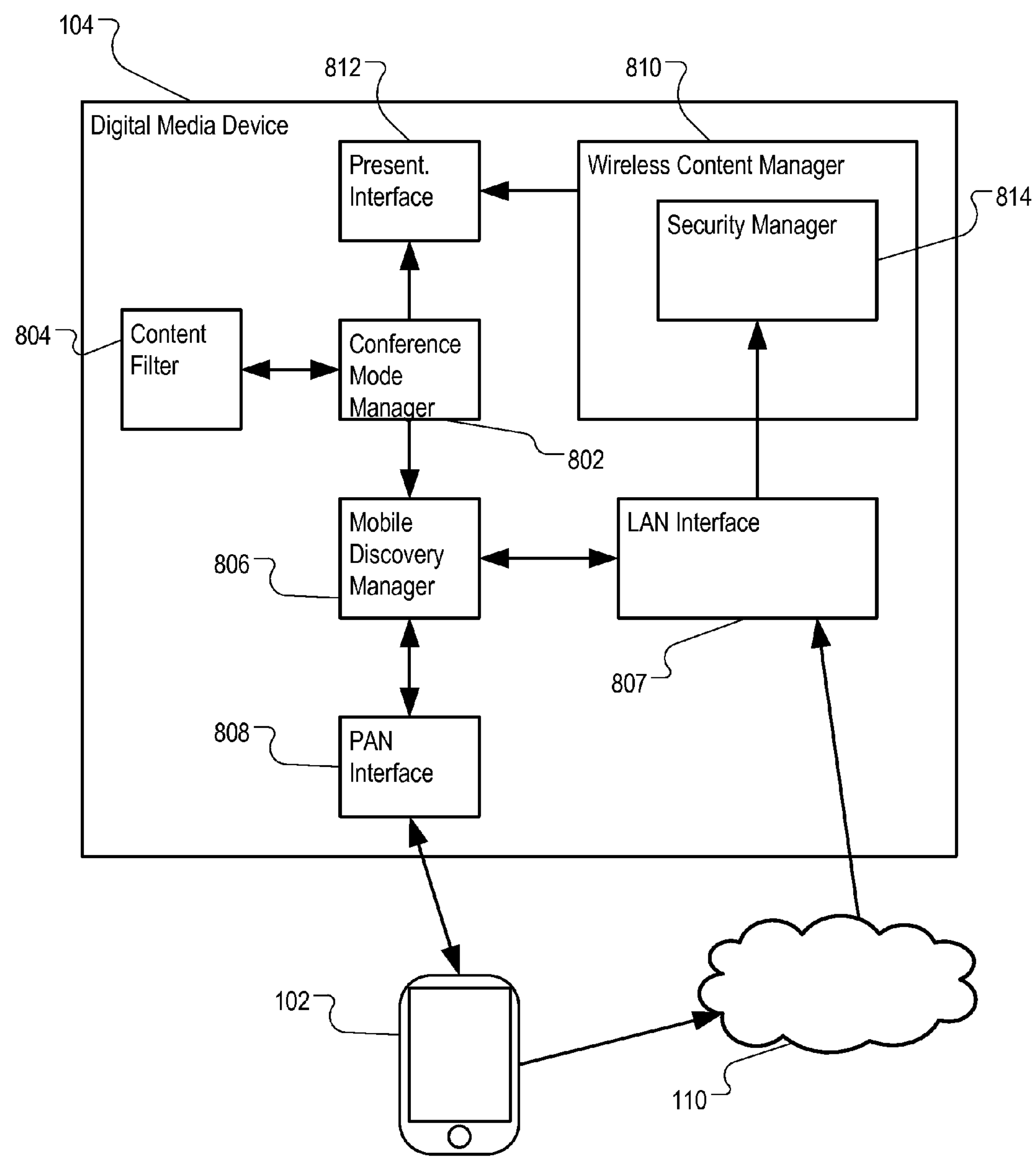
FIG. 8 is a block diagram illustrating components of an exemplary digital media device.

FIG. 8 is a block diagram illustrating components of exemplary digital media device 104. Each component of digital media device 104 can include hardware and software.

Digital media device 104 can include conference room mode manager 802. Conference room mode manager 802 is a component of digital media device 104 configured to receive a request to turn on or turn off a conference room mode of digital media device 104. Conference room mode manager 802 can use one or more content filters 804 to determine if a user is allowed to access conference room mode manager 802 or to configure conference room mode manager 802.

Conference room mode manager 802 can designate one or more trigger events for activating the conference room mode. For example, conference room mode manager 802 can determine, based on a user input or a pre-defined value, a time between a last action of digital media device 104 and activation of conference room mode. In some implementations, conference room mode manager 802 can designate a device detection event as a trigger event, where digital media device 104 can activate a conference room mode when digital media device 104 detects presence of mobile device 102 using a discovery service.

Digital media device 104 can include mobile device discovery manager 806 configured to manage the discovery service. In some implementations, mobile device discovery manager 806 can communicate with LAN interface 807 to discover mobile device 102 using features and protocols of a zero configuration network. LAN interface 807 can be a component of digital media device 104 configured to communicate with mobile devices (e.g., mobile device 102) and other services through network 110, which can be a wireless local area network. In some implementations, mobile device discovery manager 806 can communicate with personal area network (PAN) interface 808. PAN interface 808 can be a component of digital media device 104 configured to communicate with mobile devices (e.g., mobile device 102) and services through a personal area network. For example, PAN interface 808 can be a Bluetooth™ interface. Mobile device discovery manager 806 can determine that mobile device 102 is detected when a PAN interface 808 detects a signal from mobile device 102.

Digital media device 104 can include wireless content manager 810. Wireless content manager 810 is a component of digital media device 104 configured to, upon being activated by conference room mode manager 802 when digital media device 104 enters conference room mode, listen to LAN interface 807 for multimedia content from mobile device 102. Upon receiving the multimedia content from mobile device 102 through LAN interface 807, wireless content manager 810 can provide the content to presentation interface 812. Presentation interface 812 is a component of digital media device 104 configured to provide content for display on display device 106. In addition, presentation interface 812 can be configured to manage presentation of user interfaces (e.g., user interfaces of FIGS. 2-7) on display device 106.

In some implementations, wireless content manager 810 can include security manager 814. Security manager 814 is a component of wireless content manager 810 programmed to generate an access token and present the token for display through presentation interface 812. Security manager 814 can manage a communication channel between digital media device 104 and mobile device 102 when mobile device 102 receive the access token from a user who can see the access token on display device 106. Security manager 814 can prevent the communication channel from being created until mobile device receives the user input.

Exemplary Procedures

Figure 9:
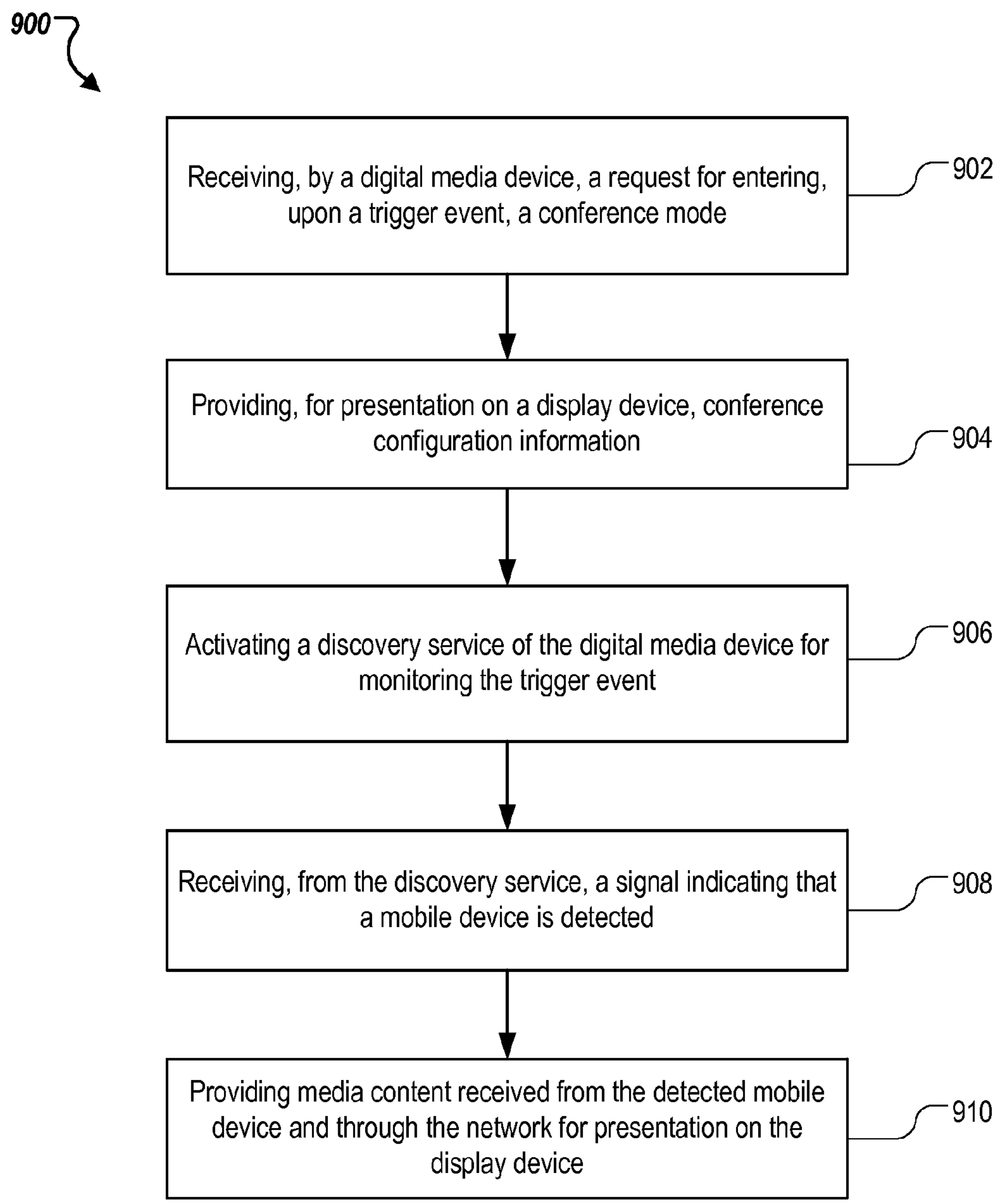
FIG. 9 is a flowchart illustrating exemplary operations of a digital media device in conference room mode.

FIG. 9 is a flowchart illustrating exemplary operations of digital media device 104. The operations can include procedure 900.

Digital media device 104 can receive (902) a request that specifies digital media device 104 shall enter a conference room operating mode upon a trigger event. In the conference room mode, digital media device 104 can be configured to present media content received from one or more mobile devices to a display device. In some implementations, the request can include a user-entered or automatically generated key (e.g., a password) for unlocking digital media device 104 from a conference room mode. Upon receiving the request, digital media device 104 can disable functions of digital media device 104 other than those for controlling presentation of the media content until the digital media device receives the key from an input device (e.g., a mobile device wirelessly connected to digital media device 104 or a remote control of digital media device 104).

In response to the request, digital media device 104 can provide (904), for presentation on the display device, conference configuration information. The conference configuration information can include a network identifier identifying a network for a mobile device to send the media content to digital media device 104 and a device identifier identifying digital media device 104 to each mobile device. The conference configuration information can include a key. The digital media device can open a communication channel with the mobile device after the key is received by the mobile device from a user. In some implementations, providing the conference configuration information for presentation can include providing the conference configuration information for presentation as a portion of a screen saver, the conference configuration information overlaying user-selected content of the screen saver. In some implementations, digital media device 104 can detect that a screen saver setting causes the screen saver to be disabled (e.g., when a time threshold for activating the screen saver is set to infinity). Digital media device 104 can then provide the conference configuration information for presentation after a period of inaction satisfies a conference room mode activation threshold (e.g., two minutes). In some implementations, when digital media device 104 provides the conference configuration information for presentation, digital media device 104 can remove, from display, control icons for functions of the digital media device other than those for controlling presentation of media content received from a mobile device.

In some implementations, providing the conference configuration information for presentation can occur upon a trigger event. The trigger event can include a temporal event. The trigger event can include a proximity event, when digital media device 104 detects a mobile device.

In some implementations, in response to the request received in stage 902, digital media device 104 can activate (906) a discovery service of the digital media device for monitoring the trigger event. The trigger event can include a detection, by the discovery service, a mobile device. In some implementations, the discovery service can be configured to detect the mobile device using a zero-configuration network including service discovery, address assignment, and hostname resolution without requiring manual configuration or a configuration server.

In some implementations, the discovery service can be configured to detect the mobile device using a detector configured to detect the mobile device when the mobile device is located within a proximity threshold distance of the digital media device. For example, the discovery service can be configured to detect the mobile device when a signal strength received from the mobile device over a PAN satisfies a signal strength threshold. In some implementations, the discovery service can be configured to detect the mobile device using a detector configured to detect that the mobile device is in physical contact with the digital media device or with an object located within a threshold distance of the digital media device. The contact detector can be an accelerometer for detecting a tapping of the mobile device.

Digital media device 104 can receive (908), from the discovery service, a signal indicating that a mobile device is detected. Digital media device 104 can then monitor the mobile device for media content.

Digital media device 104 can provide (910) media content received from the detected mobile device and through the network (as identified in the conference configuration information) for presentation on the display device.

In some implementations, digital media device 104 can be configured to protect a conference room mode. Digital media device 104 can receive a power interruption event (e.g., when digital media device 104 is unplugged from power). When the power is restored, digital media device 104 can provide a prompt for display for a specified time. The prompt can indicate that, in a time window that lasts a pre-specified time from restoration of power, a user is permitted to enable functions disabled in the conference room mode if the user provides a correct password. The prompt can have a full reset option that is accessible without the password, and a partial reset option that is accessible when the password is entered. When digital media device 104 receives a selection of the full reset option, digital media device 104 can delete from digital media device 104 all user-entered account information, and enable the functions disabled in the conference room mode. When digital media device 104 receives a selection of the partial reset option, digital media device 104 can enabling the disabled functions without deleting the user-entered account information. When digital media device 104 fail to receive a selection or a password within the time window, digital media device 104 can provide the conference configuration information for presentation and keep the disabled functions disabled.

Exemplary System Architecture

Figure 10:
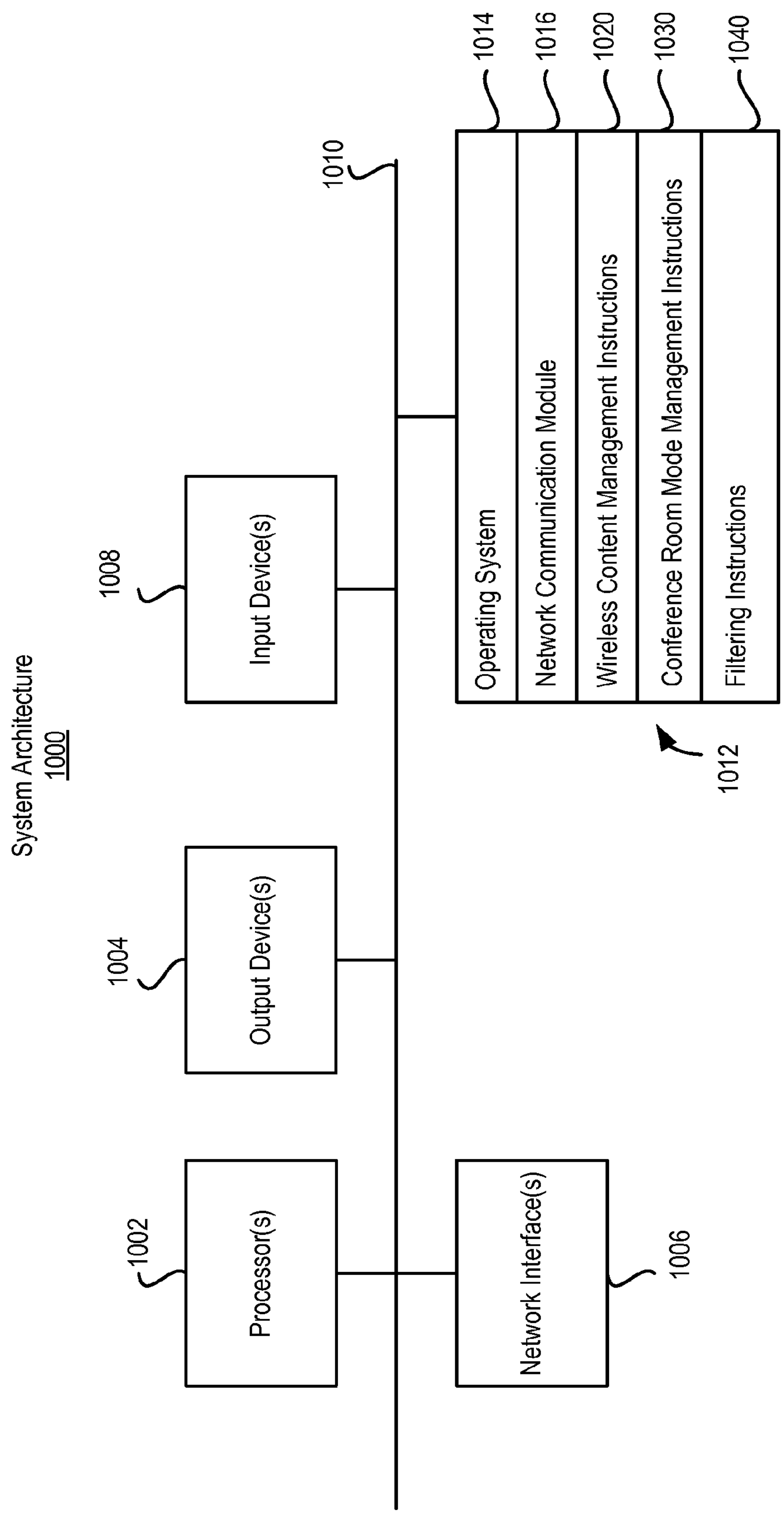
FIG. 10 is a block diagram of exemplary system architecture for implementing the features and operations of FIGS. 1-9.

FIG. 10 is a block diagram of exemplary system architecture 1000 for implementing the features and operations of FIGS. 1-9. Other architectures are possible, including architectures with more or fewer components. In some implementations, architecture 1000 includes one or more processors 1002 (e.g., dual-core Intel® Xeon® Processors), one or more output devices 1004 (e.g., an interface to a LCD monitor), one or more network interfaces 1006, one or more input devices 1008 (e.g., interfaces for connecting to a mouse, keyboard, touch-sensitive display, or a remote control) and one or more computer-readable mediums 1012 (e.g., RAM, ROM, SDRAM, hard disk, optical disk, flash memory, etc.). These components can exchange communications and data over one or more communication channels 1010 (e.g., buses), which can utilize various hardware and software for facilitating the transfer of data and control signals between components.

The term "computer-readable medium" refers to any medium that participates in providing instructions to processor 1002 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 1012 can further include operating system 1014 (e.g., Mac OS® server, Windows Server®, UNIX®, Linux®, or iOS®), network communication module 1016, wireless content management instructions 1020, conference room mode management instructions 1030, and filtering instructions 1040. Operating system 1014 can be multi-user, multiprocessing, multitasking, multithreading, real time, etc. Operating system 1014 performs basic tasks, including but not limited to: recognizing input from and providing output to devices 1006, 1008; keeping track and managing files and directories on computer-readable mediums 1012 (e.g., memory or a storage device); controlling peripheral devices; and managing traffic on the one or more communication channels 1010. Network communications module 1016 includes various components for establishing and maintaining network connections (e.g., software for implementing communication protocols, such as TCP/IP, HTTP, etc.). Wireless content management instructions 1020 can include computer instructions that, when executed, cause processor 1002 to perform operations of wireless content manager 810. Conference room mode management instructions 1030 can include computer instructions that, when executed, cause processor 1002 to perform operations of conference room mode manager 802. Filtering instructions 1040 can include computer instructions that, when executed, cause processor 1002 to determine whether to allow an exit from a conference room mode.

Architecture 1000 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, a PAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations of the invention have been described. Nevertheless, it will be understood that various modifications can be made without departing from the spirit and scope of the invention.

What is claimed is:

1. A method comprising:

receiving, by a digital media device, a request for entering, upon a trigger event, a conference room mode, wherein in the conference room mode, the digital media device is configured to present media content received from one or more mobile devices;

in response to the request:

providing, for presentation on a display device, conference configuration information, the conference configuration information including a network identifier identifying a network for a mobile device to send the media content to the digital media device and a device identifier identifying the digital media device to each mobile device; and activating a discovery service of the digital media device for monitoring the trigger event, wherein the trigger event comprises a detection of the mobile device by the discovery service;

receiving, by the digital media device and from the discovery service, a signal indicating that the mobile device is detected; and providing media content received from the detected mobile device and through the network for presentation on the display device.

2. The method of claim 1, wherein the discovery service is configured to detect the mobile device using at least one of:

a zero-configuration network including service discovery, address assignment and hostname resolution; or a detector configured to detect the mobile device when the mobile device is located within a threshold distance of the digital media device or is in physical contact with the digital media device or with an object located within the threshold distance of the digital media device.

3. The method of claim 1, wherein the conference configuration information includes a key, wherein the digital media device opens a communication channel with the mobile device after the key is received by the mobile device from a user.

4. The method of claim 1, wherein providing the conference configuration information for presentation comprises providing the conference configuration information for presentation as a portion of a screen saver, the conference configuration information overlaying user-selected content of the screen saver.

5. The method of claim 1, wherein providing the conference configuration information for presentation comprises:

determining, by the digital media device, that a screen saver setting causes the screen saver to be disabled; and then providing the conference configuration information for presentation after a period of inaction satisfies a conference room mode activation threshold.

6. The method of claim 1, wherein providing the conference configuration information for presentation comprises removing, from display, control icons for functions of the digital media device.

7. The method of claim 1, wherein:

the request comprises a user-entered or automatically generated key, and the method comprises:

upon receiving the request, disabling, by the digital media device, functions of the digital media device until the digital media device receives the key from an input device.

8. The method of claim 7, comprising:

receiving, by the digital media device, a power interruption event; and when the power is restored to the digital media device, providing, by the digital media device for presentation on the display device for at most a pre-specified time, a prompt for enabling the disabled functions, the prompt comprises a full reset option that is accessible without the key, and a partial reset option that is accessible when the key is entered.

9. The method of claim 8, comprising one of:

upon receiving a selection of the full reset option, deleting, from the digital media device, user-entered account information and enabling the disabled functions;

upon receiving a selection of the partial reset option and the key, enabling the disabled functions; or upon not receiving a selection of an option during the pre-specified time, providing the conference configuration information for presentation and keeping the disabled functions disabled.

10. A system comprising:

a digital media device comprising one or more computer processors; and a storage device coupled to the digital media device, the storage device storing instructions operable to cause the digital media device to perform operations comprising:

receiving a request for entering, upon a trigger event, a conference room mode, wherein in the conference room mode, the digital media device is configured to present media content received from one or more mobile devices;

in response to the request:

providing, for presentation on a display device, conference configuration information, the conference configuration information including a network identifier identifying a network for a mobile device to send the media content to the digital media device and a device identifier identifying the digital media device to each mobile device; and activating a discovery service of the digital media device for monitoring the trigger event, wherein the trigger event comprises a detection of the mobile device by the discovery service;

receiving, from the discovery service, a signal indicating that the mobile device is detected; and providing media content received from the detected mobile device and through the network for presentation on the display device.

11. The system of claim 10, wherein the discovery service is configured to detect the mobile device using at least one of:

a zero-configuration network including service discovery, address assignment and hostname resolution; or a detector configured to detect the mobile device when the mobile device is located within a threshold distance of the digital media device or is in physical contact with the digital media device or with an object located within the threshold distance of the digital media device.

12. The system of claim 10, wherein the conference configuration information includes a key, wherein the digital media device opens a communication channel with the mobile device after the key is received by the mobile device from a user.

13. The system of claim 10, wherein providing the conference configuration information for presentation comprises providing the conference configuration information for presentation as a portion of a screen saver, the conference configuration information overlaying user-selected content of the screen saver.

14. The system of claim 10, wherein providing the conference configuration information for presentation comprises:

determining, by the digital media device, that a screen saver setting causes the screen saver to be disabled; and then providing the conference configuration information for presentation after a period of inaction satisfies a conference room mode activation threshold.

15. The system of claim 10, wherein providing the conference configuration information for presentation comprises removing, from display, control icons for functions of the digital media device.

16. The system of claim 10, wherein:

the request comprises a user-entered or automatically generated key, and the operations comprise:

upon receiving the request, disabling, by the digital media device, functions of the digital media device until the digital media device receives the key from an input device.

17. The system of claim 16, the operations comprising:

receiving, by the digital media device, a power interruption event; and when the power is restored to the digital media device, providing, by the digital media device for presentation on the display device for at most a pre-specified time, a prompt for enabling the disabled functions, the prompt comprises a full reset option that is accessible without the key, and a partial reset option that is accessible when the key is entered.

18. The system of claim 17, the operations comprising one of:

upon receiving a selection of the full reset option, deleting, from the digital media device, user-entered account information and enabling the disabled functions;

upon receiving a selection of the partial reset option and the key, enabling the disabled functions; or upon not receiving a selection of an option during the pre-specified time, providing the conference configuration information for presentation and keeping the disabled functions disabled.

19. A non-transitory storage device storing computer instructions operable to cause a digital media device to perform operations comprising:

receiving a request for entering, upon a trigger event, a conference room mode, wherein in the conference room mode, the digital media device is configured to present media content received from one or more mobile devices;

in response to the request:

providing, for presentation on a display device, conference configuration information, the conference configuration information including a network identifier identifying a network for a mobile device to send the media content to the digital media device and a device identifier identifying the digital media device to each mobile device; and activating a discovery service of the digital media device for monitoring the trigger event, wherein the trigger event comprises a detection of the mobile device by the discovery service;

receiving, from the discovery service, a signal indicating that the mobile device is detected; and providing media content received from the detected mobile device and through the network for presentation on the display device.

20. The non-transitory storage device of claim 19, wherein the discovery service is configured to detect the mobile device using at least one of:

a zero-configuration network including service discovery, address assignment and hostname resolution; or a detector configured to detect the mobile device when the mobile device is located within a threshold distance of the digital media device or is in physical contact with the digital media device or with an object located within the threshold distance of the digital media device.

21. The non-transitory storage device of claim 19, wherein the conference configuration information includes a key, wherein the digital media device opens a communication channel with the mobile device after the key is received by the mobile device from a user.

22. The non-transitory storage device of claim 19, wherein providing the conference configuration information for presentation comprises providing the conference configuration information for presentation as a portion of a screen saver, the conference configuration information overlaying user-selected content of the screen saver.

23. The non-transitory storage device of claim 19, wherein providing the conference configuration information for presentation comprises:

determining, by the digital media device, that a screen saver setting causes the screen saver to be disabled; and then providing the conference configuration information for presentation after a period of inaction satisfies a conference room mode activation threshold.

24. The non-transitory storage device of claim 19, wherein providing the conference configuration information for presentation comprises removing, from display, control icons for functions of the digital media device.

25. The non-transitory storage device of claim 19, wherein:

the request comprises a user-entered or automatically generated key, and the operations comprise:

upon receiving the request, disabling, by the digital media device, functions of the digital media device until the digital media device receives the key from an input device.

26. The non-transitory storage device of claim 25, the operations comprising:

receiving, by the digital media device, a power interruption event; and when the power is restored to the digital media device, providing, by the digital media device for presentation on the display device for at most a pre-specified time, a prompt for enabling the disabled functions, the prompt comprises a full reset option that is accessible without the key, and a partial reset option that is accessible when the key is entered.

27. The non-transitory storage device of claim 26, the operations comprising one of:

upon receiving a selection of the full reset option, deleting, from the digital media device, user-entered account information and enabling the disabled functions;

upon receiving a selection of the partial reset option and the key, enabling the disabled functions; or upon not receiving a selection of an option during the pre-specified time, providing the conference configuration information for presentation and keeping the disabled functions disabled.

* * * * *